United States Patent
Zhang et al.

(10) Patent No.: US 8,537,737 B2
(45) Date of Patent: Sep. 17, 2013

(54) SCALABLE VIDEO MULTICAST WITH NON-OVERLAPPING BEAMFORMING ANTENNAS

(75) Inventors: Honghai Zhang, Ewing, NJ (US); Yuanxi Jiang, Anhui (CN); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/046,258

(22) Filed: Mar. 11, 2011

(65) Prior Publication Data
US 2012/0188929 A1    Jul. 26, 2012

Related U.S. Application Data

(60) Provisional application No. 61/312,910, filed on Mar. 11, 2010, provisional application No. 61/450,901, filed on Mar. 9, 2011.

(51) Int. Cl.
| H04H 20/71 | (2008.01) |
| H04W 4/00 | (2009.01) |
| H04J 3/26 | (2006.01) |
| H01Q 3/00 | (2006.01) |
| H04M 1/00 | (2006.01) |

(52) U.S. Cl.
USPC ........... 370/312; 370/329; 370/432; 342/372; 455/562.1

(58) Field of Classification Search
USPC ....... 370/312, 329, 432; 342/372; 455/562.1
See application file for complete search history.

(56) References Cited

U.S. PATENT DOCUMENTS
2010/0127931 A1 * 5/2010 Rensburg et al. ............. 342/372

* cited by examiner

*Primary Examiner* — Andrew Lai
*Assistant Examiner* — Albert Shih
(74) *Attorney, Agent, or Firm* — Joseph Kolodka

(57) ABSTRACT

A method includes initializing transmission of multicast data with non-overlapping beamforming antennas by a wireless access point responsive to multiple clients; determining a beam pattern for transmission of the data by the access point responsive to feedback on a signal-to-noise-ratio SNR of each client under every beam pattern; and scheduling a multicast of the data to the clients responsive to the determining and to one of an optimal beam streaming configuration and a sub-optimal beam streaming configuration for partitioning the beam patterns into groups for creating composite beam patterns associated with assigned modulation coding and video streams.

18 Claims, 3 Drawing Sheets

SCALABLE VIDEO MULTICAST WITH NON-OVERLAPPING BEAMFORMING ANTENNAS

This application claims the benefit of U.S. Provisional Application No. 61/312,910, entitled "Wireless Multicasting with Switched Beamforming Antennas", filed on Mar. 11, 2010, U.S. Provisional Application No. 61/450,901, entitled "SVC-Based Multicast Streaming with Beamforming Antennas", filed Mar. 9, 2011, and this application is related to U.S. patent application Ser. No. 13/046,230, entitled "Wireless Multicasting with Beamforming Antennas", filed Mar. 11, 2011, the contents of which are incorporated by reference herein.

FIELD OF THE INVENTION

The present invention relates generally to wireless communications and, more particularly, to scalable video multicast with non-overlapping beamforming antennas.

BACKGROUND OF THE INVENTION

Employing multicast to deliver video applications in wireless networks (such as Mobile TV, electronic classroom, video conference, sports telecast, etc.) has received tremendous attention in recent years. There has been proposed a new rate-adaptation algorithm for multicasting multimedia content, efficient resource allocation algorithms for multicasting scalable video coding (SVC) streams and the multicast streaming problem with SVC-encoded videos has also been studied.

On one hand, wireless medium, due to its shared nature, provides natural support for multicast traffic and is efficient in utilizing wireless radio resources. On the other hand, a challenging issue for wireless multicast is that the transmission rate is limited by the user with the worst channel condition in the multicast group. Using beamforming technologies can potentially address the challenge because beamforming antennas can focus the energy along a particular direction, thereby increasing the minimum channel quality of a group of users.

Several recent works have considered exploiting beamforming antennas for wireless multicast transmissions. There has been studied the wireless multicast issue with beamforming antennas where the objective is to ensure full coverage and minimize the total transmission delay. In another work, there was considered the wireless multicast video transmission with beamforming antennas. Both of these works assume a different channel model in a typical indoor WiFi environment, where the designed single-lobe beam patterns, due to heavy reflection, penetration, and diffusion, overlap with each other. These works do not consider the more challenging problem of how to exploit non-overlapping beamforming antennas to enhance scalable video coded (SVC) encoded video delivery in multi-cast streaming systems.

Accordingly, there is a need for a method that exploits non-overlapping beamforming antennas to enhance video delivery in multicast streaming with SVC encoded videos.

SUMMARY OF THE INVENTION

In one aspect of the invention, a method includes initializing transmission of multicast data with non-overlapping beamforming antennas by a wireless access point responsive to multiple clients; determining a beam pattern for transmission of the data by the access point responsive to feedback on a signal-to-noise-ratio SNR of each client under every beam pattern; and scheduling a multicast of the data to the clients responsive to the determining and to one of an optimal beam streaming configuration and a sub-optimal beam streaming configuration for partitioning the beam patterns into groups for creating composite beam patterns associated with assigned modulation coding and video streams. Preferably, the optimal beam streaming configuration includes determining values of system utility at a boundary of the transmission of multicast data, determining system utility under all possible conditions of said transmission of multicast data, and determining a maximum system utility for said transmission for multicast data.

In an alternative aspect of the invention, an apparatus includes means for initializing transmission of multicast data with non-overlapping beamforming antennas by a wireless access point responsive to multiple clients; means for determining a beam pattern for transmission of the data by the access point responsive to feedback on a signal-to-noise-ratio SNR of each client under every beam pattern; and means for scheduling a multicast of the data to the clients responsive to the determining and to one of an optimal beam streaming configuration and a sub-optimal beam streaming configuration for partitioning the beam patterns into groups for creating composite beam patterns associated with assigned modulation coding and video streams.

BRIEF DESCRIPTION OF DRAWINGS

These and other advantages of the invention will be apparent to those of ordinary skill in the art by reference to the following detailed description and the accompanying drawings.

DETAILED DESCRIPTION

The invention is directed to exploiting non-overlapping beamforming antennas to enhance the video delivery in a multicast streaming system with SVC encoded videos, thereby, maximizing the overall, weighted sum, video quality. The inventive technique partitions single-lobe beams into groups, forms a composite beam with each group of single-lobe beams, and then schedules all generated composite beams to serve all clients. The invention employs an optimal solution when the number of (single-lobe) beams is small (which is the typical case) via a combination of dynamic programming and partial enumeration. The invention also employs low-complexity greedy schemes to solve the problem with arbitrary number of (single-lobe) beams.

Figure 1:
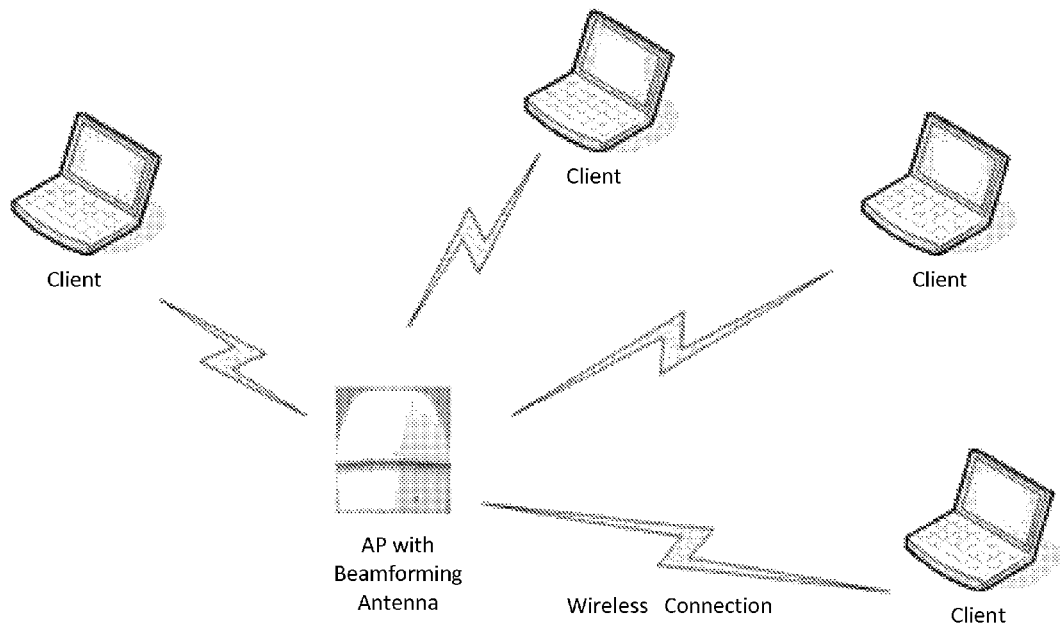
FIG. 1 is a diagram of an exemplary system architecture under which the inventive scalable video multicast with non-overlapping beamforming antennas can be employed.

Referring now to the architecture diagram of FIG. 1, there is shown wireless multicast clients that are served by an access point AP with a beamforming antenna, which runs the inventive technique. The primary goal of the inventive technique running on the AP is to select a subset of SVC video layers, and for each selected layer, partition beams into groups to create composite beams and to assign a modulated-and-coding-scheme MCS for scalable-video-coded SVC video streams to serve clients with maximum system utility.

Figure 2:
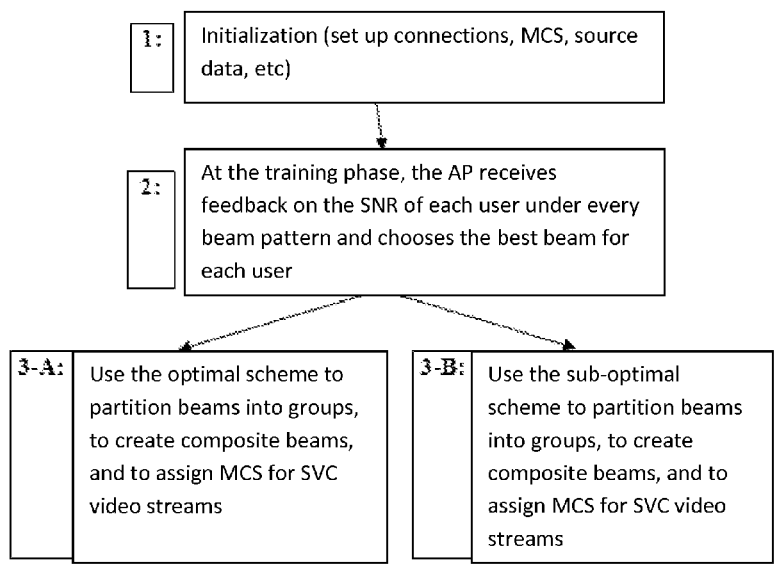
FIG. 2 is a flow diagram of a procedure for video multicast, according to the invention.

Referring now to FIG. 2, the inventive method for video multicast includes an initialization 1, a training phase 2, and then beams are partitioned into groups using either an optimal process 3A or a sub-optimal process 3B.

At step 3A2, the process determines system utility under all possible conditions. It obtains the following recursive equation for $U(\vec{z},l,t)$:

$$U(\vec{z}, l, t) = \max(\Delta U_l(\vec{z}) + U(\vec{z}, l-1, t - \tau(\vec{z}, l)), \quad (1)$$
$$U(\vec{z}^{(k)}, l, t), k = 1, \ldots b),$$

$$q(\vec{z}, l, t) = \begin{cases} 0, & \text{if } \Delta U_l(\vec{z}) + U(\vec{z}, l-1, t-\tau(\vec{z},l)) > \max(U(\vec{z}^{(k)}, l, t), k=1, \ldots b) \\ \operatorname{argmax}(U(\vec{z}^{(k)}, l, t), k = 1, \ldots b), & \text{otherwise} \end{cases} \quad (2)$$

Figure 3:
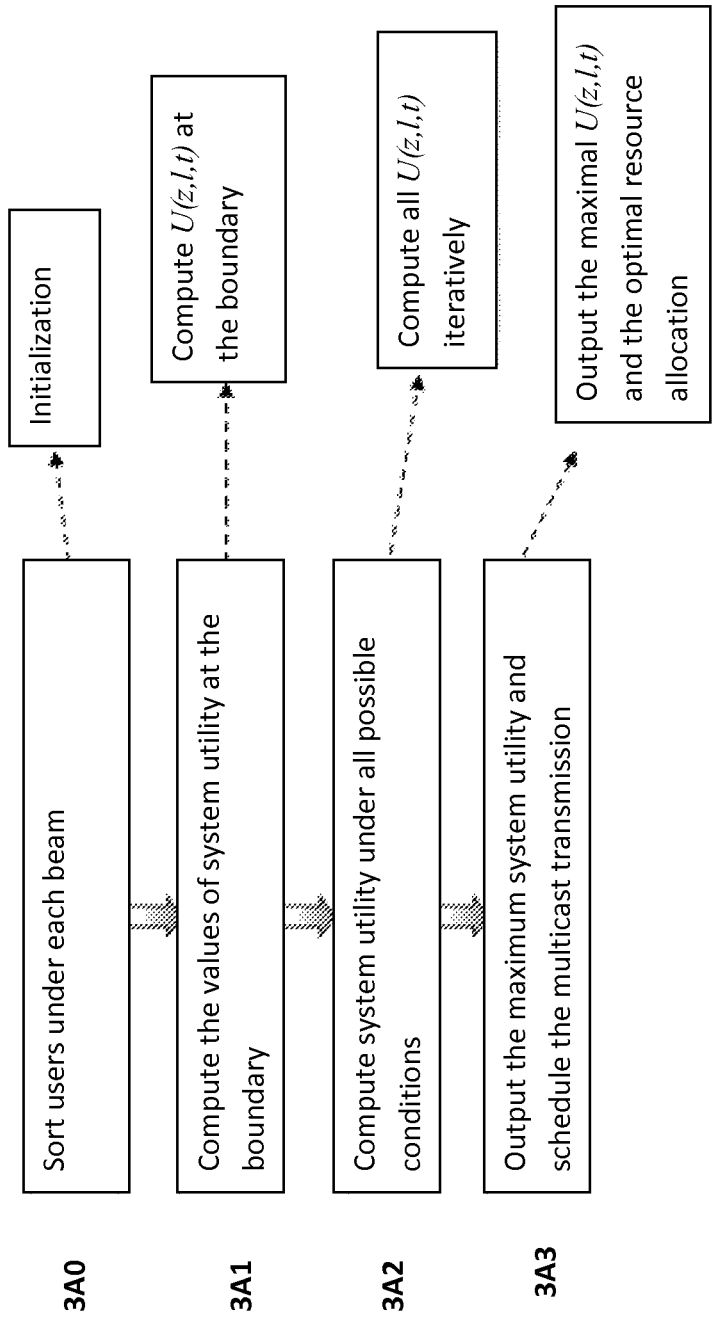
FIG. 3 is a flow diagram of optimal beam-streaming OBS, according to the invention.
Figure 4:
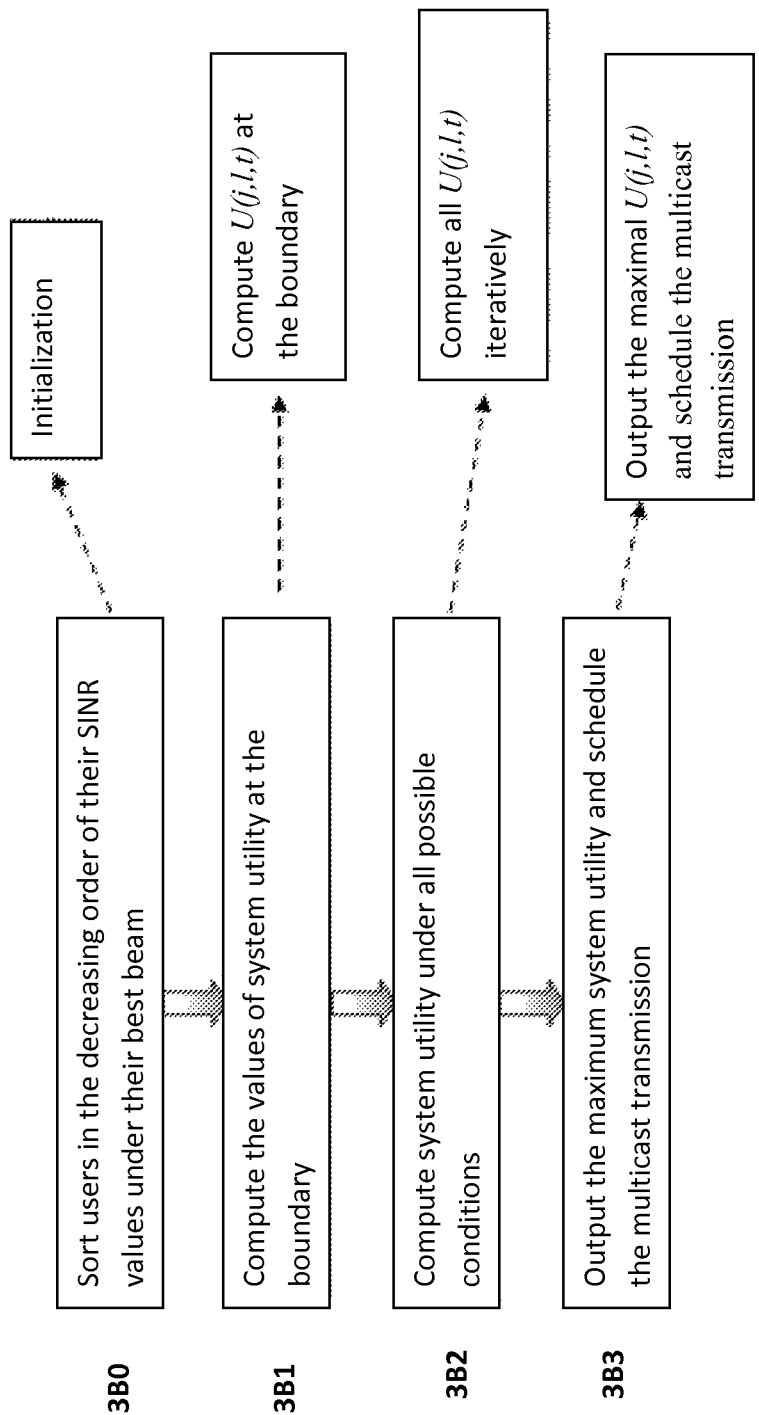
FIG. 4 is a flow diagram of sub-optimal beam-streaming SBS, according the invention.

Initialization entails setup of the of connections, MCS table and the multicast data into the system. At the training phase, each user measures the channel state information and sends it to the AP. The channel state information includes the average SINR (signal-to-interference-and-noise-ratio) under each beam pattern for each user. Then the best beam for each user is chosen. It is also possible and preferable that each user just reports the best beam and the average SINR under the best beam. Lastly, the base station uses the proposed optimal scheme (3A) or sub-optimal scheme (3B) to select and partition beams into groups. For each group of beams, a composite beam is generated under the ASP model. Then the base station assigns MCS for SVC video stream and schedules the multicast transmission. The optimal beam-streaming OBS process is shown in FIG. 3 and the sub-optimal beam streaming SBS process is shown in FIG. 4.

Referring again to FIG. 3, at step 3A0, the invention assigns each user to the beam under which he has the highest SINR. Then the process sorts the users who are assigned to each beam. The process uses $\sigma_j^b$ to represent the id of the user that has the jth highest SNR under beam b. Thus, $\gamma_{\sigma_1}^b \geq \gamma_{\sigma_2}^b \geq \gamma_{\sigma_3}^b \geq \ldots$, where $\gamma_{\sigma_j}^b$ is the SNR value of user $\sigma_j^b$ under its best beam b. Denote $\vec{z}$ as a vector of length B and its bth component $z_b$ represents the subscript index of $\sigma_j^b$. When there is no confusion, we also use $\vec{z}$ to represent the set of all users $\sigma_j^b$, $j \leq z_b$ under all beams b.

At step 3A1, the process defines $U(\vec{z},l,t)$ as the maximum total utility of all users where there are t slots, 1~l layers and the lth layer can be received by the user $\sigma_{z_b}^b$ under each beam b. Note that $U(\vec{z},l,t))$ includes the utility of ALL users, not limited to the set $\vec{z}$. It is assumed that the actual index $z_b$ starts from 1 and use $z_b=0$ to indicate that no user under beam b is contained in the set $\vec{z}$. It is assumed that the video layers start from index 1 and we use layer index 0 to represent that no content is transmitted. Let $\vec{0}$ denote a vector with all zeros. The process first determines the values of system utility at the boundary conditions.

$U(\vec{z},0,t)=0$, for all $\vec{z} \leq \vec{z}^{max}, t \geq 0$;

$U(\vec{z},l,t)=-\infty$, for all $\vec{z} > \vec{z}^{max}, l \geq 0, t \geq 0$;

$U(\vec{z},l,t)=-\infty$, for all $\vec{z} \leq \vec{z}^{max}, l \geq 0, t < 0$;

where $\vec{x} \leq \vec{y}$ means that the vector $\vec{x}$ is element-wise smaller than or equal to the vector $\vec{y}$, $\vec{x} > \vec{y}$ means that the vector $\vec{x}$ is element-wise larger than or equal to the vector $\vec{y}$, but at least one element in $\vec{x}$ is strictly larger than the corresponding one in $\vec{y}$.

where $\vec{z}^{(k)}$ represents the vector that is identical to $\vec{z}$ except the kth component, which is equal to $z_k+1$, $\Delta U_l(\vec{z})$ is the additional utility of layer l of all users in the set $\vec{z}$, $\tau(\vec{z},l)$ is the minimum time required to multicast the video layer l to the users in $\vec{z}$. In Eq. (1), the first term represents the case in which layer l can be received by the exact user set $\vec{z}$, the second term represents the case where at least one more user than the set $\vec{z}$ can receive layer l. $\tau(\vec{z},l)$ is computed by enumerating all possible partitions of beams. $q(\vec{z},l,t)$ in Eq. (2) is used to find the optimal resource allocation and beam partitioning.

To find the optimal resource allocations from $q(\vec{z},l,t)$, the invention proceeds as follows. First to be found is the optimal $\vec{z}^*, l^*, t^*$ that maximizes the utility U. In fact, it is sufficient to fix $l^*=L$, $t^*=T$ and just find the optimal $\vec{z}^*$. Starting from $\vec{z}=\vec{z}^*, l=l^*, t=t^*$, we use the following procedure to find the optimal allocation.

Step 1: If $q(\vec{z},l,t)=0$, then allocate $\tau(\vec{z},l)$ slots to transmit layer l such that all users in $\vec{z}$ are covered, and let $l=l-1$, go to Step 1;

Step 2: Else if $q(\vec{z},l,t)=k>0$, let $\vec{z}=\vec{z}^{(k)}$, go to Step 1.

The above two steps are repeated until $l=0$, and then the allocation of all layers is determined. Note that if $\vec{z}=\vec{0}$, then $\tau(\vec{z},l)=0$. This indicates that layer l is not transmitted. If layer l is not transmitted, all layers above it are not transmitted either.

At step 3A3, the invention outputs the maximum system utility and schedules the multicast transmission.

Referring again to FIG. 4, at step 3B0, the invention sorts all users in a particular order $\sigma=(\sigma_j, j=1, \ldots, N)$, where $\sigma_j$ represents the jth user id. Let N denote the total number of users. We require that if two users are under the same beam, the one with a higher SINR should have a higher rank (i.e., smaller index). One example of the order is based on all users' SINR values under their best beams.

At step 3B1, the process defines the utility function $U(j,l,t)$ as the maximum total utility of all users with video layers 1 to l, total slots up to t, where the video layer l can be received by users $\sigma_1 \ldots \sigma_j$. The process first determines the values of system utility at the boundary conditions.

$U(j,l,t)=-\infty$, if $t<0$ or ($t=0$ and $l>0$);

$U(N+1,l,t)=-\infty$, for all $l>0, 0 \leq t \leq T$;

$U(j,0,t)=0$, for all $1 \leq j \leq N, 0 \leq t \leq T$;

At step 3B2, the process obtains the following recursive equation for U(j,l,t) under all possible conditions.

$$U(j, l, t) = \max\left(U(j+1, l, t), U(j, l-1, t-\tau_{j,l}) + \sum_{k \in Z_j} \Delta\mu_{k,l}\right) \quad (3)$$

$$q(j, l, t) = \begin{cases} 0, & \text{if } U(j, l-1, t-\tau_{j,l}) + \sum_{k \in Z_j} \Delta\mu_{k,l} > U(j+1, l, t) \\ 1, & \text{Otherwise.} \end{cases} \quad (4)$$

where $Z_j = \{\sigma_1, \sigma_2, \ldots, \sigma_j\}$ and $\Delta\mu_{k,l}$ is the additional utility of layer l for user k. $\tau_{j,l}$ is the minimum time required to multicast the video layer l to the users in $Z_j$. We use the IFFD or MEBF scheme in [1] to compute $\tau_{j,l}$. The first term in the RHS of (3) represents the case where layer l can be received by users $\sigma_1, \sigma_2, \ldots, \sigma_j, \sigma_{j+1}$ (and possibly more), while the second term there represents the case where layer l is received only by users $\sigma_1, \sigma_2, \ldots, \sigma_j$. q(j,l,t) is used to derive the corresponding resource allocation through backtracking.

To compute the resource allocation from q(j, l, t), we employ the following procedure. We first find the optimal j* that maximize U(j,L,T). Let j=j*, l=L, t=T. We then repeat the following procedure.

Step 1. if q(j,l,t)=0, allocate $\tau_{j,l}$ slots for layer l to cover users $\sigma_1, \sigma_2, \ldots, \sigma_j$, and let l=l−1, go to Step 1.

Step 2. else let j=j+1, go to Step 1.

Repeat the above steps until l=0, when all layers are allocated. Similarly, $\tau_{0,l}=0$ indicates that layer l is not transmitted and requires time 0.

At step 3B3, the invention outputs the maximum system utility and schedules the multicast transmission.

It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A method comprising the steps of:
   initializing transmission of multicast data with non-overlapping beamforming antennas by a wireless access point responsive to multiple clients;
   determining a beam pattern for transmission of said data by said access point responsive to feedback on a signal-to-noise-ratio SNR of each said client under every said beam pattern; and
   scheduling a multicast of said data to said clients responsive to said determining and to one of an optimal beam streaming configuration and a sub-optimal beam streaming configuration for partitioning said beam patterns into groups for creating composite beam patterns associated with assigned modulation coding and video streams;
   wherein said optimal beam streaming partition comprises determining $U(\vec{z},l,t)$ at a boundary condition of said transmission of multicast data, $U(\vec{z},l,t)$ being a maximum total utility of all users where there are t slots, 1~l layers and the lth layer can be received by the clients in $\vec{z}$ under each beam, and $\vec{z}$ representing subset of clients under all beams.

2. The method of claim 1, wherein said optimal beam streaming configuration comprises determining values of system utility at a boundary condition of said transmission of multicast data.

3. The method of claim 1, wherein said optimal beam streaming configuration comprises determining system utility under all possible conditions of said transmission of multicast data.

4. The method of claim 1, wherein said optimal beam streaming configuration comprises determining a maximum system utility for said transmission for multicast data.

5. The method of claim 1, wherein, alternatively, said optimal beam streaming partition comprises determining a maximal $U(\vec{z},l,t)$ and an optimal resource allocation for said transmission of multicast data, $U(\vec{z},l,t)$ being a maximum total utility of all users where there are t slots, 1~l layers and the lth layer can be received by the clients in $\vec{z}$, which represents a subset of users under all beams.

6. The method of claim 1, wherein said sub-optimal beam streaming configuration comprises determining values of system utility at a boundary condition of said transmission of multicast data.

7. The method of claim 1, wherein said sub-optimal beam streaming configuration comprises determining system utility under all possible conditions of said transmission of multicast data.

8. The method of claim 1, wherein said sub-optimal beam streaming configuration comprises determining a maximum system utility for said transmission for multicast data.

9. The method of claim 1, wherein said sub-optimal beam streaming partition comprises determining U(j,l,t) at a boundary condition of said transmission of multicast data, U(j,l,t) being a maximum total utility of all clients with video layers 1 to l, with total slots up to t where the video layer l can be received by at least the first j clients in an ordering.

10. The method of claim 1, wherein said optimal beam streaming partition comprises determining U(j,l,t) iteratively under all possible conditions of said transmission of multicast data, U(j,l,t) being a maximum total utility of all clients with video layers 1 to l, with total slots up to t where the video layer l can be received by (at least) the first j clients in an ordering.

11. The method of claim 1, wherein said optimal beam streaming partition comprises determining a maximal U(j,l,t) and scheduling said transmission of multicast data, U(j,l,t) being a maximum total utility of all clients with video layers 1 to l, with total slots up to t where the video layer l can be received by (at least) the first j clients in an ordering.

12. An apparatus comprising:
   a computer processing architecture configured for initializing transmission of multicast data with non-overlapping beamforming antennas by a wireless access point responsive to multiple clients determining a beam pattern for transmission of said data by said access point responsive to feedback on a signal-to-noise-ratio SNR of each said client under every said beam pattern and scheduling a multicast of said data to said clients responsive to said determining and to one of an optimal beam streaming configuration and a sub-optimal beam streaming configuration for partitioning said beam patterns into groups for creating composite beam patterns associated with assigned modulation coding and video streams;
   wherein said optimal beam streaming partition comprises determining a maximal $U(\vec{z},l,t)$ and an optimal resource allocation for said transmission of multicast data, U( $\vec{z}$,l,t) being a maximum total utility of all users where there are t slots, 1~l layers and the lth layer can be received by the clients in $\vec{z}$, which represents a subset of users under all beams.

13. The apparatus of claim 12, wherein, alternatively, said optimal beam streaming partition comprises determining U($\vec{z}$,l,t) at a boundary condition of said transmission of multicast data, U($\vec{z}$,l,t) being a maximum total utility of all users where there are t slots, 1~l layers and the lth layer can be received by the clients in $\vec{z}$, which represents a subset of users under all beams.

14. The apparatus of claim 12, wherein, alternatively, said optimal beam streaming partition comprises determining U($\vec{z}$,l,t) iteratively under all possible conditions of said transmission of multicast data, U($\vec{z}$,l,t) being a maximum total utility of all users where there are t slots, 1~l layers and the lth layer can be received by the clients in $\vec{z}$, which represents a subset of users under all beams.

15. The apparatus of claim 12, wherein said sub-optimal beam streaming partition comprises determining U(j,l,t) at a boundary condition of said transmission of multicast data, U(j,l,t) being a maximum total utility of all users with video layers 1 to l, with total slots up to t where the video layer l can be received by at least the first j clients in an ordering.

16. The apparatus of claim 12, wherein said optimal beam streaming partition comprises determining U(j,l,t) iteratively under all possible conditions of said transmission of multicast data, U(j,l,t) being a maximum total utility of all users with video layers 1 to l, with total slots up to t where the video layer l can be received by (at least) the first j clients in an ordering.

17. The apparatus of claim 12, wherein said optimal beam streaming partition comprises determining a maximal U(j,l,t) and scheduling said transmission of multicast data, U(j,l,t) being a maximum total utility of all users with video layers 1 to l, with total slots up to t where the video layer l can be received by (at least) the first j clients in an ordering.

18. A method comprising the steps of:
initializing transmission of multicast data with non-overlapping beamforming antennas by a wireless access point responsive to multiple clients;
determining a beam pattern for transmission of said data by said access point responsive to feedback on a signal-to-noise-ratio SNR of each said client under every said beam pattern; and
scheduling a multicast of said data to said clients responsive to said determining and to one of an optimal beam streaming configuration and a sub-optimal beam streaming configuration for partitioning said beam patterns into groups for creating composite beam patterns associated with assigned modulation coding and video streams;
wherein said optimal beam streaming partition comprises determining U($\vec{z}$,l,t) iteratively under all possible conditions of said transmission of multicast data, U($\vec{z}$,l,t) being a maximum total utility of all users where there are t slots, 1~l layers and the lth layer can be received by the clients in $\vec{z}$, which represents a subset of users under all beams.

* * * * *